US012811937B2

(12) United States Patent
Anikin et al.

(10) Patent No.: US 12,811,937 B2
(45) Date of Patent: Nov. 24, 2026

(54) METHOD AND A SYSTEM FOR NETWORK ACCESS CONTROL

(71) Applicant: Y.E. Hub Armenia LLC, Yerevan (AM)

(72) Inventors: Roman Anikin, Saint-Petersburg (RU); Marina Gelver, Krasnoturyinsk (RU); Eldar Zaitov, Saint-Petersburg (RU); Aleksandr Karpenko, Rostov-na-Donu (RU); Anton Konvaliuk, Moscow (RU); Pavel Kondratev, Lytkarino (RU); Sergei Korotkov, Engels (RU); Mikhail Krasnov, Dolgoprudny (RU); Nikita Kurganov, Moskow (RU); Vladimir Kutiavin, Glazov (RU); Aleksandr Lavrukov, Yekaterinburg (RU); Boris Lytochkin, Moscow (RU); Artem Rudenko, Moscow (RU); Kevin Reed, Singapore (SG)

(73) Assignee: Y.E. Hub Armenia LLC, Yerevan (AM)

( * ) Notice: Subject to any disclaimer, the term of this patent is extended or adjusted under 35 U.S.C. 154(b) by 86 days.

(21) Appl. No.: 19/057,684

(22) Filed: Feb. 19, 2025

(65) Prior Publication Data

US 2025/0286887 A1 Sep. 11, 2025

(30) Foreign Application Priority Data

Mar. 5, 2024 (RU) ........................... RU2024105681

(51) Int. Cl.
*H04L 9/40* (2022.01)

(52) U.S. Cl.
CPC ...... *H04L 63/0892* (2013.01); *H04L 63/0823* (2013.01); *H04L 63/108* (2013.01); *H04L 63/1416* (2013.01); *H04L 63/20* (2013.01)

(58) Field of Classification Search
CPC ............ H04L 63/0892; H04L 63/0823; H04L 63/108; H04L 63/1416; H04L 63/20
See application file for complete search history.

(56) References Cited

U.S. PATENT DOCUMENTS 7,876,772 B2 * 1/2011 Kwan ..................... H04L 63/10
709/216
9,049,184 B2 6/2015 Wilson
(Continued)

FOREIGN PATENT DOCUMENTS

CN 105187459 A 12/2015
RU 2638741 C2 12/2017
RU 2648942 C1 3/2018

OTHER PUBLICATIONS

Russian Search Report dated Mar. 4, 2025 issued in respect of the counterpart Russian Patent Application No. RU 2024105681.
(Continued)

*Primary Examiner* — Lynn D Feild
*Assistant Examiner* — Abdullah Almamun
(74) *Attorney, Agent, or Firm* — BCF LLP

(57) ABSTRACT

A method and a server for port-based network access control of a plurality of host network devices in a local area network (LAN) are provided. The method comprises: generating, for a given host network device, a respective network certificate for accessing the LAN; generating, for the respective network certificate associated with the given host network device, a respective authorization tag, indicative of a scope of actions that the given host network device is authorized to execute in the LAN; and transmitting data indicative of an association between the respective network certificate and the respective authorization tag associated with the given host network device to the authentication server of the LAN, thereby causing the authentication server to enable the given
(Continued)

host network device to: (i) access the LAN and (ii) execute the scope of actions therein.

18 Claims, 6 Drawing Sheets

(56) References Cited

U.S. PATENT DOCUMENTS

| | | | | |
|---|---|---|---|---|
| 11,252,190 | B1 * | 2/2022 | Sharifi Mehr | H04L 63/10 |
| 2008/0034407 | A1 * | 2/2008 | Sauter | H04L 63/0272 726/4 |
| 2008/0240104 | A1 * | 10/2008 | Villait | H04L 41/08 370/392 |
| 2016/0323265 | A1 * | 11/2016 | Esdaile | H04W 12/06 |
| 2017/0034172 | A1 * | 2/2017 | Biggs | H04L 63/08 |
| 2018/0198786 | A1 | 7/2018 | Shah et al. | |
| 2018/0352003 | A1 | 12/2018 | Winn et al. | |
| 2019/0057204 | A1 * | 2/2019 | Marcovecchio | G06F 21/10 |
| 2022/0232003 | A1 * | 7/2022 | Smolny | H04L 63/0807 |
| 2022/0264300 | A1 | 8/2022 | Nix | |
| 2024/0179168 | A1 * | 5/2024 | Manthiramoorthy | G06F 21/44 |

OTHER PUBLICATIONS

Debnath et al., "On Re-engineering the X.509 PKI with Executable Specification for Better Implementation Guarantees", Published on Nov. 2021, Virtual Event, Republic of Korea, pp. 1388-1404, https://doi.org/10.1145/3460120.3484793.

Marques et al., "Integration of the Captive Portal paradigm with the 802.1X architecture", Published on Aug. 26, 2019, https://arxiv.org/abs/1908.09927.

* cited by examiner

METHOD AND A SYSTEM FOR NETWORK ACCESS CONTROL

CROSS-REFERENCE

The present application claims priority to Russian Patent Application No. 2024105681, entitled "Method and a System for Network Access Control", filed Mar. 5, 2024, the entirety of which is incorporated herein by reference.

FIELD

The present technology relates to methods and systems network access control, and in particular, to port-based network access control.

BACKGROUND

Network access control (NAC) includes various approaches aimed at enabling or restricting access of various electronic devices to a network (such as a private or corporate network) and nodes thereof, including restricting unauthorized access of the electronic devices or restricting access to those electronic devices breaching certain security polices of the network.

To that end, certain conventional NAC approaches include issuing specific digital certificates to authorized electronic devices. A given certificate enables mutual authentication between a respective authorized device and nodes of the network, thereby enabling the given authorized electronic device to gain access to the network. In other words, the given certificate includes data of (i) digital identity of the respective electronic device; and (ii) permissions for actions that the respective electronic device can execute in the network. Such actions can include, for example, accessing and using a printer of the network or accessing and launching an application run by one of network's servers.

However, in cases where the authorized electronic device breaches the network's security polices, re-issuing the respective digital certificate may not be effective to prevent spread of a possible malicious activity within the network. For example, due to a malware attack, an antivirus application of the electronic device can be deactivated; however, before receiving a new certificate, the electronic device can still access and remain connected to the network, spreading the malicious activity. In another example, the respective digital certificate of the given authorized electronic device can be stolen by a fraudulent electronic device, enabling the fraudulent electronic device to act in the network on behalf of the given authorized electronic device.

Identifying such breach events, re-issuing the digital certificates, and causing registration of the re-issued digital certificates on the nodes of the network can be resource and time consuming, which may cause, on one hand, severe damage to the data stored within the network; and on the other hand, lowered user experience of users of authorized electronic devices.

Certain prior art approaches have been proposed to tackle the above-identified technical problem.

US Patent Application Publication No.: 2018/0352003-A1, published on Dec. 6, 2018, assigned to Opswat Inc, and entitled "NETWORK ACCESS CONTROL WITH COMPLIANCE POLICY CHECK," discloses methods involving an authentication application, a client application, or a combination of a network access control server with the authentication application and the client application. The client application collects compliance data regarding the user device and communicates the compliance data to the network access control server. The network access control server generates a compliance check result based on whether the compliance data indicates that the user device is compliant with a security policy for the software-as-a-service server. The authentication application grants access by the user device when the compliance check result is positive; and the authentication application denies access by the user device when the compliance check result is negative. In some embodiments, the compliance check result or a user device identifier is stored in a web browser cookie or a client certificate on the user device.

US Patent Application Publication No.: 2018/0198786-A1, published on Jul. 12, 2018, assigned to Pulse Secure LLC, and entitled "ASSOCIATING LAYER 2 AND LAYER 3 SESSIONS FOR ACCESS CONTROL," discloses a network access control (NAC) device that enforces one or more policies for accessing one or more remote network devices. The NAC device includes a processor configured to receive authentication credentials from the user device over an L2 connection including first identification information of the user device, authenticate the user device using the authentication credentials, receive compliance information from the user device over an L3 connection including second identification information of the user device, associate the L2 connection with the L3 connection using the first identification information and the second identification information, and in response to determining that the compliance information satisfies the one or more policies, authorize the user device to access the one or more remote network devices.

SUMMARY

It is an object of the present technology to ameliorate at least one inconvenience present in the prior art.

Developers of the present technology have realized that controlling access of the authorized electronic device to the network can be implemented without re-issuing certificates.

More specifically, various non-limiting embodiments of the present technology are directed to controlling permissions of the given authorized electronic device within the network through a specific authorization tag assigned to the respective digital certificate. Thus, in response to the breach event, according to at least some non-limiting embodiments of the present technology, a NAC server of the network can be configured to replace the assigned authorization tag enabling the given authorized electronic device to execute a predetermined scope of actions in normal operation mode, with a safety mode tag, enabling the given authorized electronic device to execute a limited scope of actions and hence disabling it to execute the actions associated with the normal operation mode. The limited scope of actions can be specified such that when the given authorized electronic device is compromised, it will not be capable of causing damage to the network. This may help effectively restrict the access to suspicious electronic devices mitigating risks of damages to the data stored and transmitted within the network.

Also, certain non-limiting embodiments of the present methods and systems are directed to monitoring certain parameters of the given authorized electronic device that are indicative of the breach event (such as de-activating the antivirus application, or forcefully ending certain tasks of the operating system) through different channels. More specifically, the NAC server can be configured to monitor such parameters by causing (via a dedicated internal device monitoring manager application, for example) the given authorized electronic device to collect and transmit these data to the NAC server. At the same time, the NAC server can be configured to collect these data via external device monitoring manager applications, which collect the data from the authorized electronic devices independently thereof. Thus, in case where the given authorized electronic device has been compromised, which may result in falsifying the data of device parameters transmitted to the NAC server by the internal device monitoring manager application, the NAC server would still be able to acquire valid information of the given authorized electronic device's state. This may aid in identifying breach events associated with the authorized electronic devices more effectively, which may further help bolster the security of the network from unauthorized access.

More specifically, in accordance with one broad aspect of the present technology, there is provided a computer-implementable method for port-based network access control of a plurality of host network devices in a local area network (LAN). The port-based network access control is implemented in accordance with an IEEE 802.1x standard. The LAN includes: (i) a server hosting a certificate database, and (ii) an authentication server configured to allow access of the plurality of host network devices to the LAN based on respective network certificates. The LAN is associated with a network security policy. The method comprising: generating, in the certificate database, for a given host network device of the plurality of host network devices, a respective network certificate for accessing the LAN; generating, in the certificate database, for the respective network certificate associated with the given host network device, a respective authorization tag, indicative of a scope of actions that the given host network device is authorized to execute in the LAN; transmitting data indicative of an association between the respective network certificate and the respective authorization tag associated with the given host network device to the authentication server of the LAN, thereby causing the authentication server to enable the given host network device to: (i) access the LAN and (ii) execute the scope of actions therein; determining if there is an occurrence of a breach event associated with the given host network device, the breach event comprising an indication of the given host network device breaching the network security policy of the LAN; in response to determining the occurrence of the breach event associated with the given host network device: replacing, in the certificate database, the respective authorization tag of the respective network certificate of the given host network device, with a safety mode tag, the safety mode tag being indicative of a limited scope of actions, narrower than the scope of actions of the respective authorization tag, that the given host device is authorized to execute in the LAN until the breach event is resolved; and transmitting data indicative of an association between the respective network certificate and the safety mode tag associated with the given host network device to authentication server of the LAN, thereby causing the authentication server to: (i) disable the given host network device to execute the scope of actions associated with the respective authorization tag; and (ii) enable the given host network device to execute only the limited scope of actions.

In some implementations of the method, the breach event comprises an indication of an other host network device of the plurality of host network devices using the respective network certificate associated with the given host network device for accessing the LAN; and the determining the occurrence of the breach event comprises: monitoring, based on respective network certificates, sessions of each one of the plurality of host network devices in the LAN over a given period; and identifying an overlap of at least two sessions of using the respective network certificate associated with the given host device longer than a predetermined threshold period.

In some implementations of the method, the breach event comprises an indication of a deviation of a current value of at least one predetermined device parameter of a plurality of predetermined device parameters of the given host network device from a respective predetermined value thereof; and the determining the occurrence of the breach event comprises monitoring current values of the plurality of predetermined device parameters of the given host network device.

In some implementations of the method, the monitoring comprises causing the given host electronic device to: (i) collect, using an internal device monitoring manager, the current values of each one of the plurality of predetermined device parameters; and (ii) transmit the current values of each one of the plurality of predetermined device parameters to the server.

In some implementations of the method, the internal device monitoring manager is an Osquery internal device monitoring manager.

In some implementations of the method, the monitoring comprises the server executing a network device monitoring manager configured to query, over the LAN, at least a portion of the plurality of host network devices, including the given host network device, for the current values of each one of the plurality of predetermined device parameters thereof.

In some implementations of the method, the network device monitoring manager comprises at least one of an SCCM, Jamf, and Salt Manager network device monitoring managers.

T In some implementations of the method, the monitoring comprises: causing the given host electronic device to: (i) collect, using an internal device monitoring manager, the current values of each one of the plurality of predetermined device parameters; and (ii) transmit the current values of each one of the plurality of predetermined device parameters to the server; and the server executing a network device monitoring manager configured to query, over the LAN, at least a portion of the plurality of host network devices, including the given host network device, for the current values of each one of the plurality of predetermined device parameters thereof; and wherein the breach event comprises an indication of the deviation of the current value of the at least one predetermined device parameter of the given host network device from the respective predetermined value thereof determined by both the internal device monitoring manager and the system center configuration device manager.

In some implementations of the method, in response to determining that the breach event has been resolved, the method further comprises: replacing, in the certificate database, the safety tag of the respective network certificate of the given host network device back with the respective authorization tag; and transmitting the data indicative of the association between the respective network certificate and the respective authorization tag associated with the given host network device to the authentication server of the LAN, thereby causing the authentication server to enable the given host network device to execute the scope of actions.

In accordance with an other broad aspect of the present technology, there is provided a server for port-based network access control of a plurality of host network devices in a local area network (LAN). The port-based network access control is implemented in accordance with an IEEE 802.1x standard. The LAN includes an authentication server configured to allow access of the plurality of host network devices to the LAN based on respective network certificates. The LAN is associated with a network security policy. The server hosts a certificate database. The server comprises at least one processor and at least one non-transitory computer-readable medium comprising executable instructions, which, when executed by the at least one processor, cause the server to: generate, in the certificate database, for a given host network device of the plurality of host network devices, a respective network certificate for accessing the LAN; generate, in the certificate database, for the respective network certificate associated with the given host network device, a respective authorization tag, indicative of a scope of actions that the given host network device is authorized to execute in the LAN; transmit data indicative of an association between the respective network certificate and the respective authorization tag associated with the given host network device to the authentication server of the LAN, thereby causing the authentication server to enable the given host network device to: (i) access the LAN and (ii) execute the scope of actions therein; determine if there is an occurrence of a breach event associated with the given host network device, the breach event comprising an indication of the given host network device breaching the network security policy of the LAN; in response to determining the occurrence of the breach event associated with the given host network device: replace, in the certificate database, the respective authorization tag of the respective network certificate of the given host network device, with a safety mode tag, the safety mode tag being indicative of a limited scope of actions, narrower than the scope of actions of the respective authorization tag, that the given host device is authorized to execute in the LAN until the breach event is resolved; and transmit data indicative of an association between the respective network certificate and the safety mode tag associated with the given host network device to authentication server of the LAN, thereby causing the authentication server to: (i) disable the given host network device to execute the scope of actions associated with the respective authorization tag; and (ii) enable the given host network device to execute only the limited scope of actions.

In some implementations of the server, the breach event comprises an indication of an other host network device of the plurality of host network devices using the respective network certificate associated with the given host network device for accessing the LAN; and to determine the occurrence of the breach event, the at least one processor causes the server to: monitor, based on respective network certificates, sessions of each one of the plurality of host network devices in the LAN over a given period; and identify an overlap of at least two sessions of using the respective network certificate associated with the given host device longer than a predetermined threshold period.

In some implementations of the server, the breach event comprises an indication of a deviation of a current value of at least one predetermined device parameter of a plurality of predetermined device parameters of the given host network device from a respective predetermined value thereof; and to determine the occurrence of the breach event, the at least one processor causes the server to monitor current values of the plurality of predetermined device parameters of the given host network device.

In some implementations of the server, to monitor the current values of the plurality of predetermined device parameters, the at least one processor causes the server to cause the given host electronic device to: (i) collect, using an internal device monitoring manager, the current values of each one of the plurality of predetermined device parameters; and (ii) transmit the current values of each one of the plurality of predetermined device parameters to the server.

In some implementations of the server, the internal device monitoring manager is an Osquery internal device monitoring manager.

In some implementations of the server, to monitor the current values of the plurality of predetermined device parameters, the at least one processor causes the server to execute a network device monitoring manager configured to query, over the LAN, at least a portion of the plurality of host network devices, including the given host network device, for the current values of each one of the plurality of predetermined device parameters thereof.

In some implementations of the server, the network device monitoring manager comprises at least one of an SCCM, Jamf, and Salt Manager network device monitoring managers.

In some implementations of the server, to monitor the current values of the plurality of predetermined device parameters, the at least one processor causes the server to: cause the given host electronic device to: (i) collect, using an internal device monitoring manager, the current values of each one of the plurality of predetermined device parameters; and (ii) transmit the current values of each one of the plurality of predetermined device parameters to the server; and execute a network device monitoring manager configured to query, over the LAN, at least a portion of the plurality of host network devices, including the given host network device, for the current values of each one of the plurality of predetermined device parameters thereof; and wherein the breach event comprises an indication of the deviation of the current value of the at least one predetermined device parameter of the given host network device from the respective predetermined value thereof determined by both the internal device monitoring manager and the system center configuration device manager.

In some implementations of the server, in response to determining that the breach event has been resolved, the at least one processor further causes the server to: replace, in the certificate database, the safety tag of the respective network certificate of the given host network device back with the respective authorization tag; and transmit the data indicative of the association between the respective network certificate and the respective authorization tag associated with the given host network device to the authentication server of the LAN, thereby causing the authentication server to enable the given host network device to execute the scope of actions.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations, etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
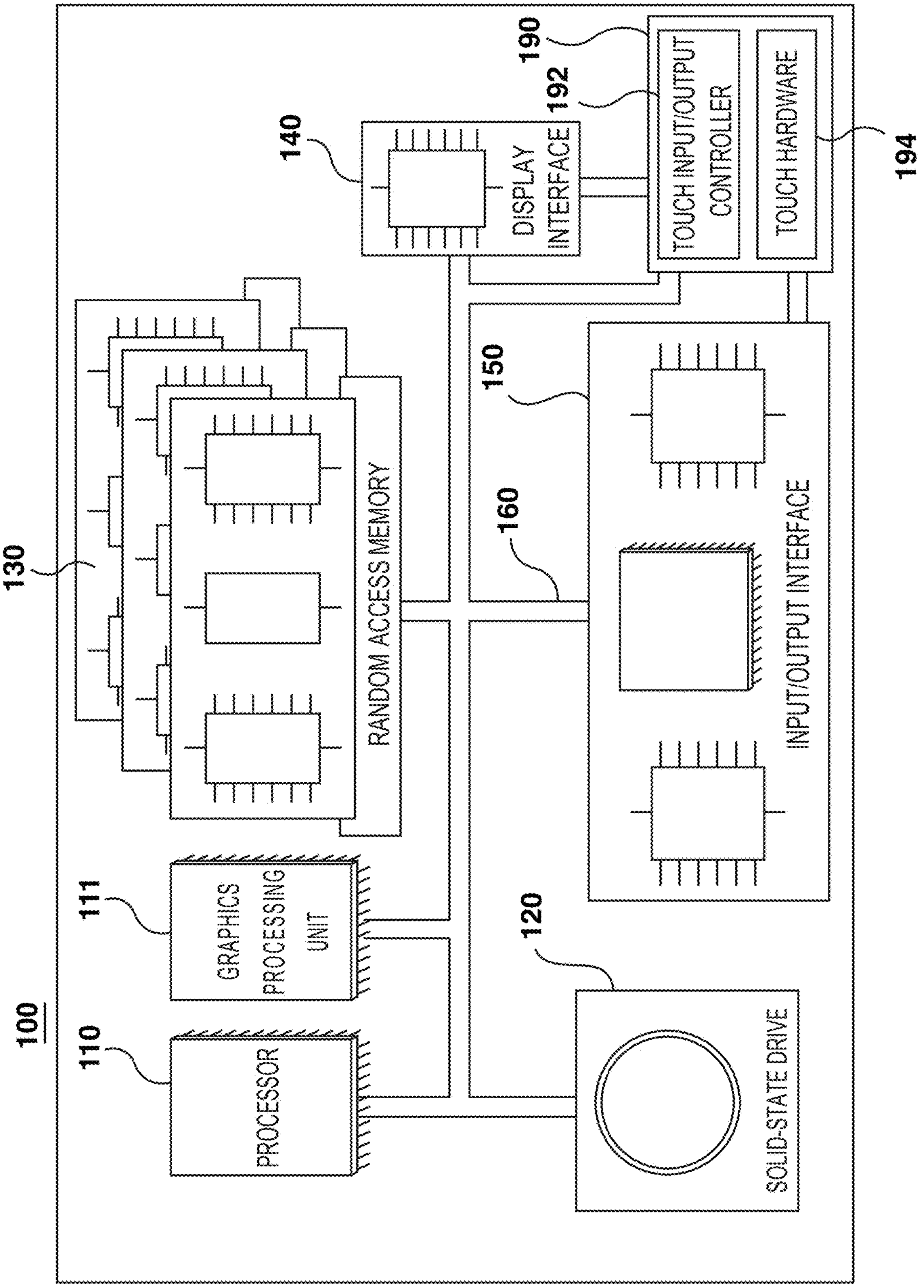
FIG. 1 depicts a schematic diagram of an example computer system for implementing certain non-limiting embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, and/or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and/or non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by a processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some non-limiting embodiments of the present technology, the touchscreen 190 is the display. The touchscreen 190 may equally be referred to as a touchscreen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not depicted), a mouse (not depicted) or a trackpad (not depicted) allowing the user to interact with the computer system 100 in addition to or instead of the touchscreen 190.

It is noted that some components of the computer system 100 can be omitted in some non-limiting embodiments of the present technology. For example, the touchscreen 190 can be omitted, especially (but not limited to) where the computer system is implemented as a server.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
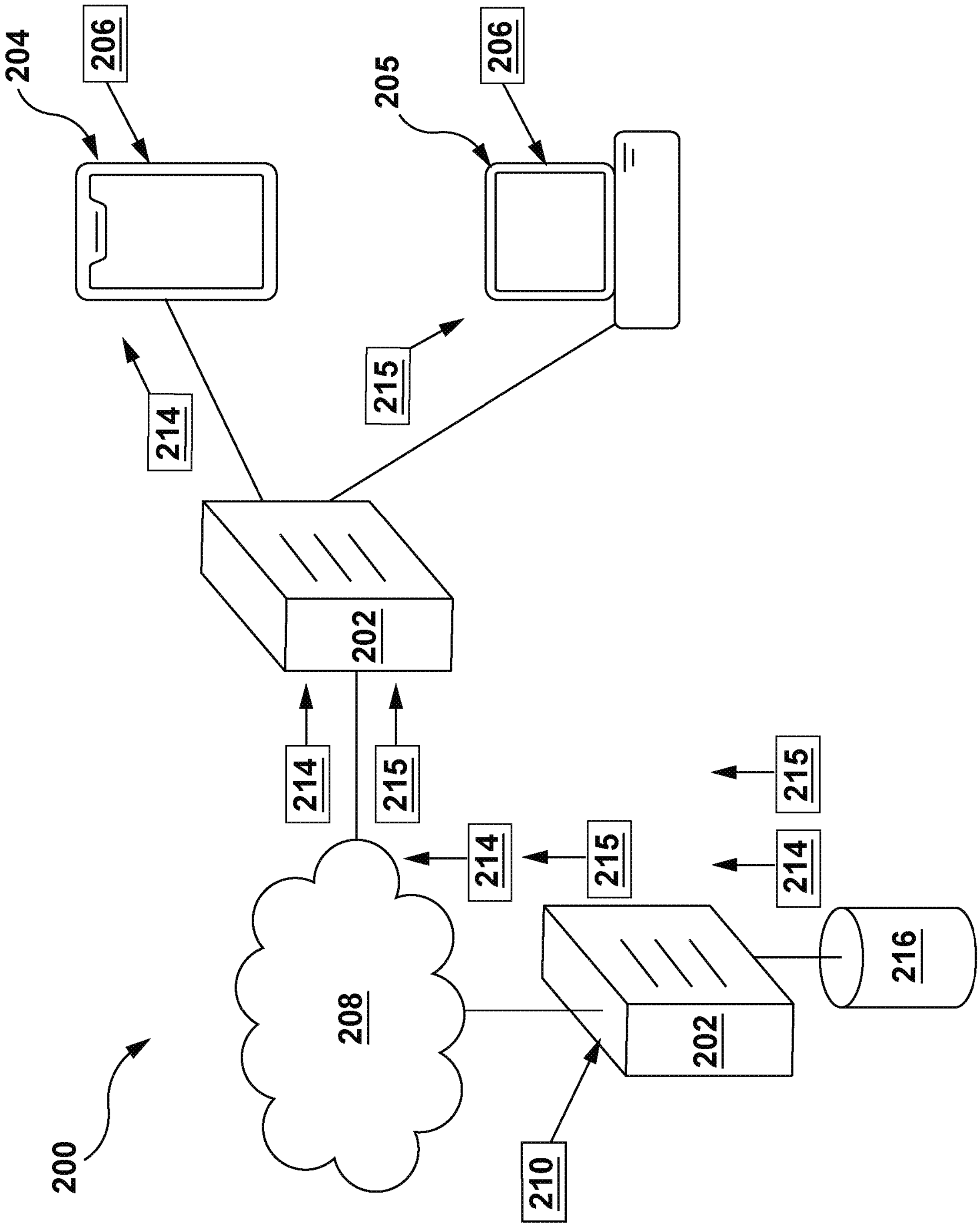
FIG. 2 depicts a networked computing environment configurable for suitable for organizing a port-based network control access (NAC) of a plurality of electronic devices to a local area network (LAN), in accordance with certain non-limiting embodiments of the present technology.

With reference to FIG. 2, there is depicted a schematic diagram of a networked computing environment 200 suitable for use with some non-limiting embodiments of the systems and/or methods of the present technology. The networked computing environment 200 comprises a network access control (NAC) server 202 and an authentication server 212 communicatively coupled, via a local access network (LAN) 208, to a first electronic device 204 and a second electronic device 205.

In some non-limiting embodiments of the present technology, a given one of the first and second electronic devices 204, 205 may be any computer hardware that is capable of running a software appropriate to the relevant task at hand. In this regard, the given one of the first and second electronic devices 204 can comprise some or all of the components of the computer system 100 of FIG. 1. Thus, some non-limiting examples of the given one of the first and second electronic devices 204, 205 may include personal computers (desktops, laptops, netbooks, etc.), smartphones, and tablets. Also, it should be expressly understood that, in some non-limiting embodiments of the present technology, the given one of the first and second electronic devices 204, 205 may be associated with a user or a group of users (not separately depicted) without departing from the scope of the present technology.

In some non-limiting embodiments of the present technology, the NAC server 202 is implemented as a conventional computer server and may comprise some or all of the components of the computer system 100 of FIG. 1. In a specific non-limiting example, the NAC server 202 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the NAC server 202 is a single server. In alternative non-limiting embodiments of the present technology (not depicted), the functionality of the NAC server 202 may be distributed and may be implemented via multiple servers. The authentication server 212 can be implemented similarly to the NAC server 202.

Further, according to certain non-limiting embodiments of the present technology, the LAN 208 can be any private or corporate LAN that connects the plurality of electronic devices in a limited area. A number of electronic devices couplable to the LAN 208 is not limited and depends on availability of network and computational resources of the LAN 208, such as those of routers (not depicted), switches (not depicted), hubs (not depicted), bridges (not depicted), and servers, including the NAC and authentication servers 202, 212. For examples, the LAN 208 can be configured to connect tens, hundreds, thousands, or even tens or hundreds of thousands of electronic devices.

It is not limited how a respective communication link among the first and second electronic devices 204, 205, the NAC and authentication servers 202, 212, and the LAN 208 is implemented. In some non-limiting embodiments of the present technology, the respective communication link can be a wired communication link. In an example, the wired communication link can be implemented as a twisted pair with an RJ45 communication interface. However, other implementations of the wired communication link (such as a fiber optic or coaxial cable) as well as suitable interfaces for coupling, for example, the given one of the first and second electronic devices 204, 205 to the authentication server 212 are also contemplated. In other non-limiting embodiments of the present technology, the respective communication link can be implemented as a wireless communication link. Various examples of wireless communication protocols that can be used for implementing the wireless communication link include, without limitation, a Bluetooth™ wireless communication protocol, a Zigbee™ wireless communication protocol, and an NFC™ wireless communication protocol. In some non-limiting embodiments of the present technology, the wireless communication link can comprise a wireless network communication link, and can hence be implemented based on a Wi-Fi™ wireless network communication protocol, one of a 3G/4G/5G wireless network communication protocols, and others. In these embodiments, at least one of: (i) the first and second electronic devices 204, 205 and the authentication server 212; (ii) the authentication server 212 and the LAN 208; and (iii) the NAC server 202 and the LAN 208 can be directly or indirectly (via an intermediary server or a virtual private network) connected therebetween via an other network (not depicted in FIG. 2), such as the Internet. Direct communication link between the NAC server 202 and each one of the first and second electronic devices 204, 205, circumventing the authentication server 212, is also envisioned.

According to certain non-limiting embodiments of the present technology, the LAN 208 can be associated with network security policies adopted therein, based on which the NAC server 202 can be configured to generate and transmit instructions to the authentication server 212 for providing or restricting access of a plurality of electronic devices, such as the first and second electronic devices 204, 205, to the LAN 208. In this regard, the first and second electronic devices 204, 205 can be referred to as "host network devices". Also, it should be noted that, in some non-limiting embodiments of the present technology, the NAC server 202 and the authentication server 212 can be implemented as a single server configured for both determining and implementation of the network security polices.

Broadly speaking, the network security polices in the LAN 208 can prescribe security standards for the electronic devices that may access and remain connected to the LAN 208. More specifically, in some non-limiting embodiments of the present technology, the network security policies can prescribe, among others, target values of a plurality of predetermined device parameters, which each one of the first and second electronic devices 204, 205 must have in order to access and remain in the LAN 208.

In various non-limiting embodiments of the present technology, the plurality of predetermined device parameters of the given electronic device, such as the first electronic device 204, can include, without limitation: (i) software applications installed on the first electronic device 204; (ii) a name and a version of an operating system run by the first electronic device 204; (iii) parameters of the operating system, including, for example, the language settings, font sizes and styles, time and regional settings, and the like; and (iv) processes and services launched in the operating system of the first electronic device 204.

By way of example, a given predetermined device parameter can be an antivirus application, for which the network security polices can prescribe a target binary value, such as "TRUE", indicative of that the antivirus application must be installed and/or active on each one of the first and second electronic devices 204, 205 while accessing the LAN 208. In another example, the given predetermined device parameter can be a font style of a graphical user interface of the operating system of the given electronic device, for which the network security polices can prescribe a plurality of target string-type values, such as "Times New Roman", "Arial", or "Cambria", which is indicative of that each one of the first and second electronic devices 204, 205, while accessing the LAN 208, must have at least one of only these font styles set in their operating systems.

In yet other example, the given predetermined device parameter can be a process or a service which have been pre-identified as being associated with execution of untrusted and/or malicious application. For this predetermined device parameter, the network security polices can prescribe a target binary value, such as "FALSE", which is indicative of that each one of the first and second electronic devices 204, 205, while accessing the LAN 208, must not have this process and/or service launched in their operating systems. To that end, in some non-limiting embodiments of the present technology, the NAC server 202 can be configured to host a blacklist of applications and/or processes and services associated therewith that have been identified as being untrusted and/or malicious.

Thus, the NAC server 202 can be configured to: (i) enable access of each one of the first and second electronic devices 204, 205 to the LAN 208; (ii) determine permitted actions for each one of the first and second electronic devices 204, 205 to execute in the LAN 208, as will be described below; (iii) transmit data indicative of the first and second electronic devices 204, 205 and the actions permitted thereto to the authentication server 212 for providing access of each one of the first and second electronic devices 204, 205 to the LAN 208 in accordance with the network security polices; and (iv) monitor whether each one of the first and second electronic devices 204, 205 comply with the network security policies when connected thereto.

According to certain non-limiting embodiments of the present technology, the NAC server 202 can be configured to enable or restrict network access of each one of the first and second electronic devices 204, 205 to the LAN 208 via issuing and further transmitting to the authentication server 212 respective network (digital) certificates for each one of the first and second electronic devices.

In the context of the present specification, a given digital certificate denotes an electronic document issued for the given electronic device and including: (i) a pair of public and private keys; (ii) information of identity of the given electronic device, including, for example, a type, a brand name, an operating system associated with the given electronic device; and ownership of the given electronic device (if applicable); and (iii) a digital signature of an issuing body (also referred to as a "Certificate Authority, CA") that has verified and validated the contents of the certificate by its private key, thereby leaving its digital signature. Thus, by means of this digital certificate, the given electronic device can be configured to encrypt messages to be sent to a given recipient (another electronic device or a server) with a private key, and the given recipient of the messages, after verification of the digital signature of the issuing body on the digital certificate, can be provided with the public key associated with the given electronic device for decrypting and reading the messages.

In some non-limiting embodiments of the present technology, the issuing body can be a third-party entity trusted by both the senders (that is, the given electronic devices in the above example) and recipients for issuing, signing, and storing the digital certificates. In other non-limiting embodiments of the present technology, the issuing body can be the same as that controlling the operation of (or otherwise owning) the NAC server 202 of the LAN 208. Simply as an example and not as a limitation, in some non-limiting embodiments of the present technology, the issuing body can be Yandex LLC of Lev Tolstoy Street, No. 16, Moscow, 119021, the Russian Federation.

In these embodiments, the NAC server 202 can be configured itself to run an internal CA (not separately labelled) configured to issue, sign, and store the digital certificates. Alternatively, to generate the digital certificates, the NAC server 202 can be configured to access an external (third-party) CA.

Thus, for example, the NAC server 202 can be configured to generate: (1) a first digital certificate 214 for the first electronic device 204; and (2) a second digital certificate 215 for the second electronic device 205. Further, the NAC server 202 can be configured to transmit these certificates: (1) to the respective electronic devices, thereby authorizing them to access the LAN 208; and (2) to the authentication server 212 for further authenticating the first and second electronic devices 204, 205 in the LAN 208. A format of the digital certificates issued by the NAC server 202 is not limited and will depend, inter alia, on a selected standard for implementing the NAC to the LAN 208.

In some non-limiting embodiments of the present technology, the NAC server 202 can be configured to implement the NAC in accordance with an IEEE 802.1x standard (also referred to herein as "port-based" NAC) enabling to control access of the plurality of the electronic devices to the LAN 208 on a Network and Transport layers of the OSI model. Thus, in these embodiments, the NAC server 202 can be configured to issue the digital certificates of an X.509 format. To enable the use of the digital certificates of the X.509 format, the authentication server 212 can be configured to conduct authentication of the plurality of electronic devices with the LAN 208 using an EAP-TSL authentication protocols.

Figure 3:
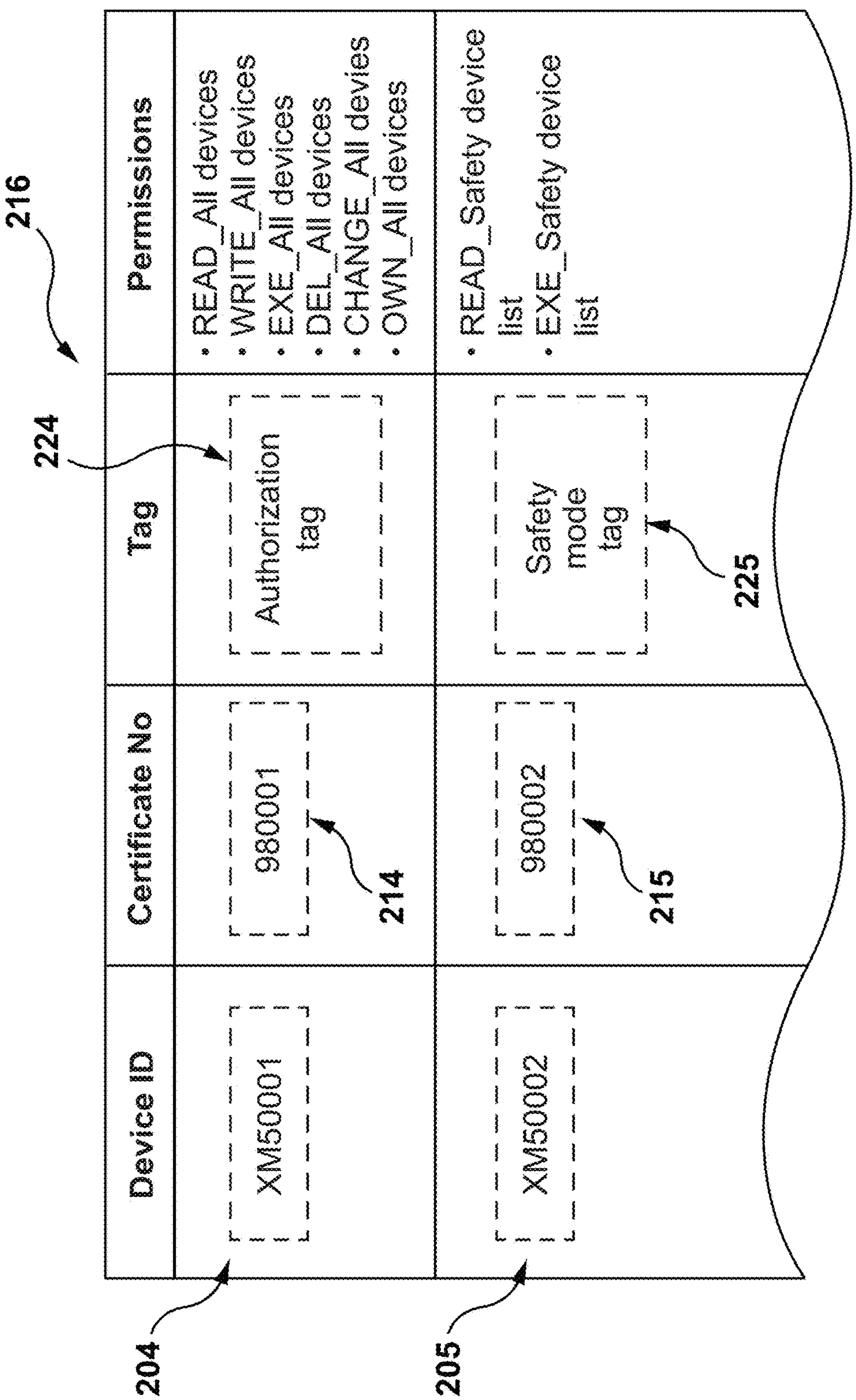
FIG. 3 depicts a schematic diagram of a certificate database hosted by a server present in the networked computing environment of FIG. 2 illustrating an example of assigning a safety mode tag to a given electronic device of the plurality of electronic devices in response to breaching network security polices of the LAN, in accordance with certain non-limiting embodiments of the present technology.

Further, to store the digital certificates, in some non-limiting embodiments of the present technology, the NAC server 202 can be configured to host (or otherwise have access to) a certificate database 216. With reference to FIG. 3, there is schematically depicted a structure of the certificate database 216, in accordance with certain non-limiting embodiments of the present technology.

As it can be appreciated, in the certificate database 216, in some non-limiting embodiments of the present technology, the NAC server 202 can be configured to store each digital certificate in association with a respective electronic devices authorized to access the LAN 208. For example, the NAC server 202 can be configured to store: (i) a device ID number of the first electronic device 204 in association with a serial number of the first digital certificate 214; and (ii) the device ID number of the second electronic device 205 in associated with the serial number of the second digital certificate 215. In some non-limiting embodiments of the present technology, the device ID number for the given electronic device can be automatically generated by the NAC server 202. In other non-limiting embodiments of the present technology, the device ID number can be inherent to the given electronic device-such as a MAC address thereof, and the NAC server 202 can be configured to obtain the device ID number from the given electronic device.

Further, according to certain non-limiting embodiments of the present technology, the NAC server 202 can be configured to determine the permitted actions for the given electronic device by assigning to the respective digital certificate, a specific tag-such as a first authorization tag 224 assigned to the first digital certificate 214 issued for the first electronic device 204. In the context of the present specification, a "tag" assigned to the respective digital certificate is an electronic document (either a separate one or a portion of the respective digital certificate) defining permissions for the given electronic device in the LAN 208. Such permissions, in various non-limiting embodiments of the present technology, can include, for example: (i) a respective predetermined scope of actions that the given electronic device is authorized to execute in the LAN 208; and (ii) a list of electronic devices, on which the given electronic device is authorized to execute the permitted actions. In some non-limiting embodiments of the present technology, the NAC server 202 can be configured to transmit information of association between the given tag and the respective digital certificate to the authentication server 212, thereby causing the authentication server 212 to enable the given electronic device to execute the respective predetermined scope of actions in the LAN 208. In some non-limiting embodiments of the present technology, the NAC server 202 can be configured to store the respective tags for each of the electronic devices authorized in the LAN 208 in the certificate database 216.

Thus, continuing with the example of FIG. 3, the NAC server 202 can be configured to assign, to the first digital certificate 214 associated with the first electronic device 204, the first authorization tag 224 specifying a following (without limitation) scope of actions permitted to be executed by the first electronic device 204 in the LAN 208: (i) reading files on all electronic devices connected to the LAN 208; (ii) adding a new file to storages of all the electronic devices connected to the LAN 208; (iii) executing executable files on all of the electronic devices connected to the LAN 208; (iv) deleting any files on all of the electronic devices connected to the LAN 208; (v) modifying any files on all of the electronic devices connected to the LAN 208; and (vi) taking ownership of any file on all of the electronic devices connected to the LAN 208. Other actions that the first electronic device 204 can authorized to execute are also envisioned. Also, it should be expressly understood that the first authorization tag 224 enabling the first electronic device 204 to execute the aforementioned actions on all of the electronic devices connected to the LAN 208 is for illustrative purposes only; and in some non-limiting embodiments of the present technology, the NAC server 202 can be configured to specify, in the first authorization tag 224, for each of the actions, respective lists of electronic devices, which can be the same or different.

Further, in some non-limiting embodiments of the present technology, the NAC server 202 can be configured to transmit the data indicative of an association between a given digital certificate and the respective tag assigned thereto to the authentication server 212 to enable the given electronic device, having the given digital certificate, to access the LAN 208 according to the permissions specified in the respective tag. To that end, in some non-limiting embodiments of the present technology, the authentication server 212 can be configured to host a separate database (not depicted) for storing therein data of the associations between the issued digital certificates and the respective tags assigned thereto received from the NAC server 202. In other non-limiting embodiments of the present technology, the NAC server 202 can be configured to share access to the certificate database 216 with the authentication server via the LAN 208.

Thus, according to certain non-limiting embodiments of the present technology, when attempting to connect to the LAN 208, the first electronic device 204 can be configured to transmit, to the authentication server 212, a request to access the LAN 208, the request including the first digital certificate 214. In response, the authentication server 212 can be configured to: (i) validate the digital signature of the issuing body of the first digital certificate 214; and (ii) in response to determining that the issuing body is a trusted CA, such as the NAC server 202, for example, authorize the first electronic device 204 to access the LAN 208. Further, according to certain non-limiting embodiments of the present technology, the authentication server 212 can be configured to authorize the first electronic device 204 to execute, in the LAN 208, the respective predetermined scope of actions specified in the first authorization tag 224.

Further, according to certain non-limiting embodiments of the present technology, the NAC server 202 can be configured to determine if there is an occurrence of a breach event associated with the given electronic device, that is, determine if the given electronic device breaches one of the network security polices. In some non-limiting embodiments of the present technology, the NAC server 202 can be configured to determine the occurrence of the breach event by monitoring and/or analyzing the current values of the plurality of predetermined device parameters of the given electronic device.

According to certain non-limiting embodiments of the present technology, the NAC server 202 can be configured to obtain the current values of the plurality of predetermined device parameters of the given electronic device, such as the first electronic device 204 in various ways. With back reference to FIG. 2, in some non-limiting embodiments of the present technology, the NAC server 202 can be configured to obtain the current values of the plurality of predetermined device parameters directly from the first electronic device 204. To that end, the first electronic device 204 can be configured execute an internal device monitoring manager application 206. Broadly speaking, the internal device monitoring manager application 206 is a software application that can be configured to collect and store various analytics of the operating system of the first electronic device 204, including the current values of the plurality of predetermined devices parameters thereof, and present these data, for example, as a relational database. Further, using the internal device monitoring manager application 206, in response to a respective request from the NAC server 202, the first electronic device 204, can be configured to transmit the relational database (or updates thereto). Further, by submitting corresponding queries to the received relational database, the NAC server 202 can be configured to obtain the current values of the plurality of predetermined device parameters of the first electronic device 204. Non-limiting examples of the internal device monitoring manager application 206 include an Osquery™ internal device monitoring manager application, an Ossec™ internal device monitoring manager application, and an ELK™ internal device monitoring manager application, as an example.

In other non-limiting embodiments of the present technology, the NAC server 202 can be configured to obtain the current values of the plurality of predetermined device parameters form a network device monitoring manager application 210. Broadly speaking, the network device monitoring manager application 210 is configured to collect the analytics of the operating systems of each one of the plurality of electronic devices connected to the LAN 208, including the first electronic device 204; however, the network device monitoring manager application 210 is configured to do it independently from each one of the plurality of electronic devices. Thus, if the current values of the plurality of predetermined device parameters collected, by the internal device monitoring manager application 206, have been falsified prior to transmitting to the NAC server 202, for example, due to a malware attack, the NAC server 202 would be capable of verifying these values based on data provided by the network device monitoring manager application 210.

In some non-limiting embodiments of the present technology, the network device monitoring manager application 210 can be executed by the NAC server 202. In other non-limiting embodiments of the present technology, the network device monitoring manager application 210 can be executed by another electronic device communicatively coupled to the LAN 208. In these embodiments, the other electronic device can be a third-party server of a manufacturer of the network device monitoring manager application 210 that has been granted access to the LAN 208. It is not limited how the network device monitoring manager application 210 is implemented and depends generally on an operating system run by plurality of electronic devices to be monitored. By way of example, and in no way as a limitation, in those non-limiting embodiments of the present technology, where the given electronic device for monitoring the current values of the plurality of predetermined parameters is running a Windows™ operating system, the network device monitoring manager application 210 can be an SCCM™ network device monitoring manager application. In another non-limiting example, where the given electronic device for monitoring the current values of the plurality of predetermined parameters is running an iOS™ operating system, the network device monitoring manager application 210 can be a Jamf™ network device monitoring manager application. In yet another example, where the given electronic device for monitoring the current values of the plurality of predetermined parameters is running a Linux™ operating system, the network device monitoring manager application 210 can be a Salt Manager™ network device monitoring manager application. In some non-limiting embodiments of the present technology, where the plurality of electronic devices connected to the LAN 208 include electronic devices running different operating system, the NAC server 202 can be configured to access different variants of the network device monitoring manager application 210 non-exhaustively mentioned above.

In yet other non-limiting embodiments of the present technology, the NAC server 202 can be configured to receive the current values of the plurality of predetermined parameters of the first electronic device 204 from both of the internal device monitoring manager application 206 and the network device monitoring manager application 210. For example, in these embodiments, the NAC server 202 can be configured to verify the data received from the internal device monitoring manager application 206 using the data received from the network device monitoring manager application 210.

In some non-limiting embodiments of the present technology, the NAC server 202 can be configured to obtain the current values of the plurality of predetermined device parameters of each one of the first and second electronic devices 204, 205 continuously, in real time. In other non-limiting embodiments of the present technology, the NAC server 202 can be configured to obtain these values from time to time, for example, once a minute, once an hour, once every twelve hours, once a day, and the like.

For example, by analyzing the current values of the plurality of predetermined device parameters of the given electronic device, such as the second electronic device 205, the NAC server 202 can be configured to determine that one of the applications that should be installed on the second electronic device 205 in accordance with the network security polices of the LAN 208, such as the antivirus application, has been deactivated or uninstalled. In another example, the NAC server 202 can be configured to determine that there is a process and/or service launched in the operating system of the second electronic device 205, which is indicative of presence and/or activity of an application that should not be installed and/or executed in accordance with the network security polices, such as a gaming application, an additional web browser application, or an application that has been identified, by the NAC server 202, as being untrusted (or otherwise malicious).

In some non-limiting embodiments of the present technology, the NAC server 202 can be configured to determine the occurrence of the breach event in response to determining that there are at least two overlapping sessions of electronic devices in the LAN 208 that have accessed the LAN 208 with a same digital certificate. To do so, in some non-limiting embodiments of the present technology, the NAC server 202 can be configured to access an access log (not labelled) of the authentication server 212, enabling the NAC server 202 to analyze: (i) which digital certificate has been used by the given electronic device to access the LAN 208; and (ii) a duration of a network session that the given electronic device remained connected to the LAN 208. In some non-limiting embodiments of the present technology, the NAC server 202 can be configured to request the access log from the authentication server 212 from time to time, such as regularly. In these embodiments, the NAC server 202 can be configured to access the access log of the authentication server 212 once an hour, once a day, once a week, and the like. In other non-limiting embodiments of the present technology, the NAC server 202 can be configured to gain real-time access to the access log of the authentication server 212 and monitor data thereof continuously.

Figure 4:
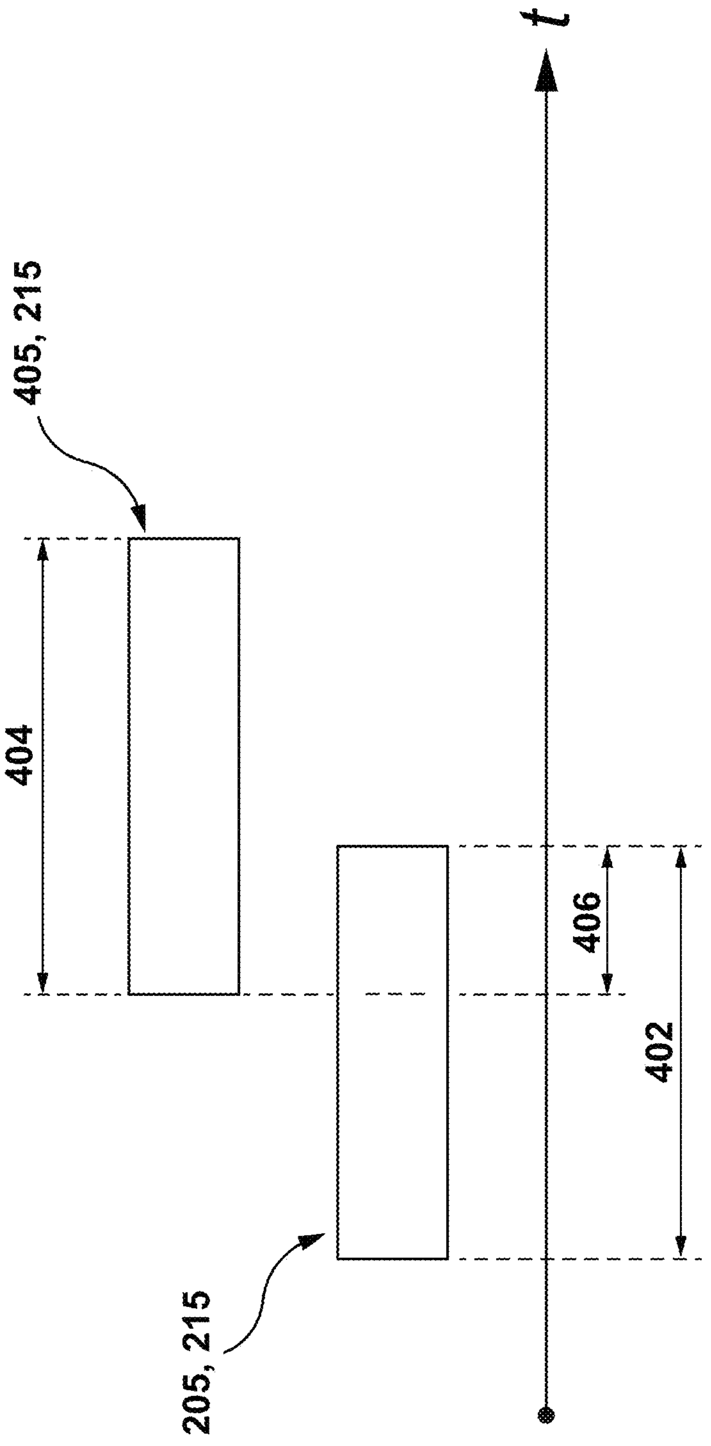
FIG. 4 depicts a time diagram of sessions of two electronic devices present in the networked computing environment that have accessed the LAN using the same digital certificate, in accordance with certain non-limiting embodiments of the present technology.

With reference to FIG. 4, there is depicted a time diagram of sessions of two electronic devices that have accessed the LAN 208 using the second digital certificate 215, in accordance with certain non-limiting embodiments of the present technology.

As it can be appreciated in an example scenario depicted in FIG. 4, the second electronic device 205 accessed the LAN 208 using the second digital certificate 215 as described above and remained connected during a first network session 402. However, while the second electronic device 205 was being connected to the LAN 208, an other, third, electronic device 405 (not depicted in FIG. 2) connected to the LAN 208 also using the second digital certificate 215, and remained connected to the LAN 208 during a second network session 404. For example, the third electronic device 405 could obtain the second digital certificate 215 as a result of a malicious attack on the second electronic device 205.

Thus, by analyzing the access log from the authentication server 212, the NAC server 202 can be configured to determine a network session overlap 406 between the first network session 402 of the second electronic device 205 and the second network session 402 of the third electronic device 405, thereby identifying the occurrence of the breach event. In some non-limiting embodiments of the present technology, the NAC server 202 can be configured to determine the occurrence of the breach event of the network session overlap 406 is longer than a predetermined time threshold, such as 1, 5, or 10 minutes.

Other examples of breaching the network security polices can include accessing the LAN 208 using an expired digital certificate, attempting to execute actions beyond the respective predetermined scope of actions specified for the given electronic device in the associated authorization tag, data received from the internal device monitoring manager application 206 being different from the corresponding data received from the network device monitoring manager application 210, and others.

Thus, in response to determining the occurrence of the breach event associated, for example, with the second electronic device 205, the NAC server 202 can be configured to restrict access to the second electronic device 205. With back reference to FIG. 3, according to certain non-limiting embodiments of the present technology, the NAC server 202 can be configured to restrict access of the second electronic device 205 by assigning, to the second digital certificate 215 associated therewith, a safety mode tag 225 in lieu of a previously assigned authorization tag, such as a second authorization tag 525 depicted in FIG. 5. In some non-limiting embodiments of the present technology, the second authorization tag 525 of the second digital certificate 215 can be similar to the first authorization tag 224 assigned to the first electronic device 204, that is, specify a same scope of actions that the second electronic device 205 is authorized to execute in the LAN 208 on a same list of electronic devices. In other non-limiting embodiments of the present technology, the second authorization tag 525 can specify at least one of a different scope of actions and a different list of electronic devices from those specified by the first authorization tag 224.

According to certain non-limiting embodiments of the present technology, the safety mode tag 225 can specify a limited scope of actions that is narrower than the respective predetermined scope of actions specified in the second authorization tag 525, such as only reading or executing executable files of the electronic devices connected to the LAN 208. In other non-limiting embodiments of the present technology, the safety mode tag 225 can specify a limited list of electronic devices, on which an electronic device having the second digital certificate 215 is authorized to execute the permitted actions. For example, electronic devices included in the limited list of electronic devices can be associated with lesser risk of compromising other electronic devices of the LAN 208. A selected electronic device from the limited list of electronic devices may be selected based on determining an associated with the selected device second authorization tag 525 of the second digital certificate 215 by the NAC server 202 or another (including third-party solutions) software including the network device monitoring manager application 210. Specifically, the selected electronic device may be associated with a unique hardware identification being additionally stored in the certificate database 216 based on which the NAC server 202 assigns the safety mode tag 225. In yet other non-limiting embodiments of the present technology, the safety mode tag 225 can specify both, the limited scope of actions, which the electronic device having the second digital certificate 215 is authorized to execute, and the limited list of electronic devices, on which the electronic devices having the second digital certificate 215 is authorized to execute the limited scope of actions. In yet other non-limiting embodiments of the present technology, the safety mode tag 225 of the second digital certificate can include an indication to prohibit any access to the electronic device having the second digital certificate 215 to the LAN 208.

Further, once the NAC server 202 has replaced, in the certificate database 216, the second authorization tag 525 of the second digital certificate 215 with the safety mode tag 225, the NAC server 202 can be configured to transmit data indicative of an association between the second digital certificate 215 and the safety mode tag 225, which can comprise an update of the certificate database 216, to the authentication server 212. In turn, the authentication server 212, after receiving the data of the association between the second digital certificate 215 and the safety mode tag 225, in response to a request from the electronic device with the second digital certificate 215 (such as the second electronic device 205) for access to the LAN 208, can be configured to provide access to the second electronic device 205 in accordance with permissions specified in the safety mode tag 225, that is, at least one of (i) authorizing the second electronic device 205 to execute the limited scope of actions; and (ii) authorizing the second electronic device 205 to execute the permitted actions on the limited list of electronic devices of the LAN 208.

Figure 5:
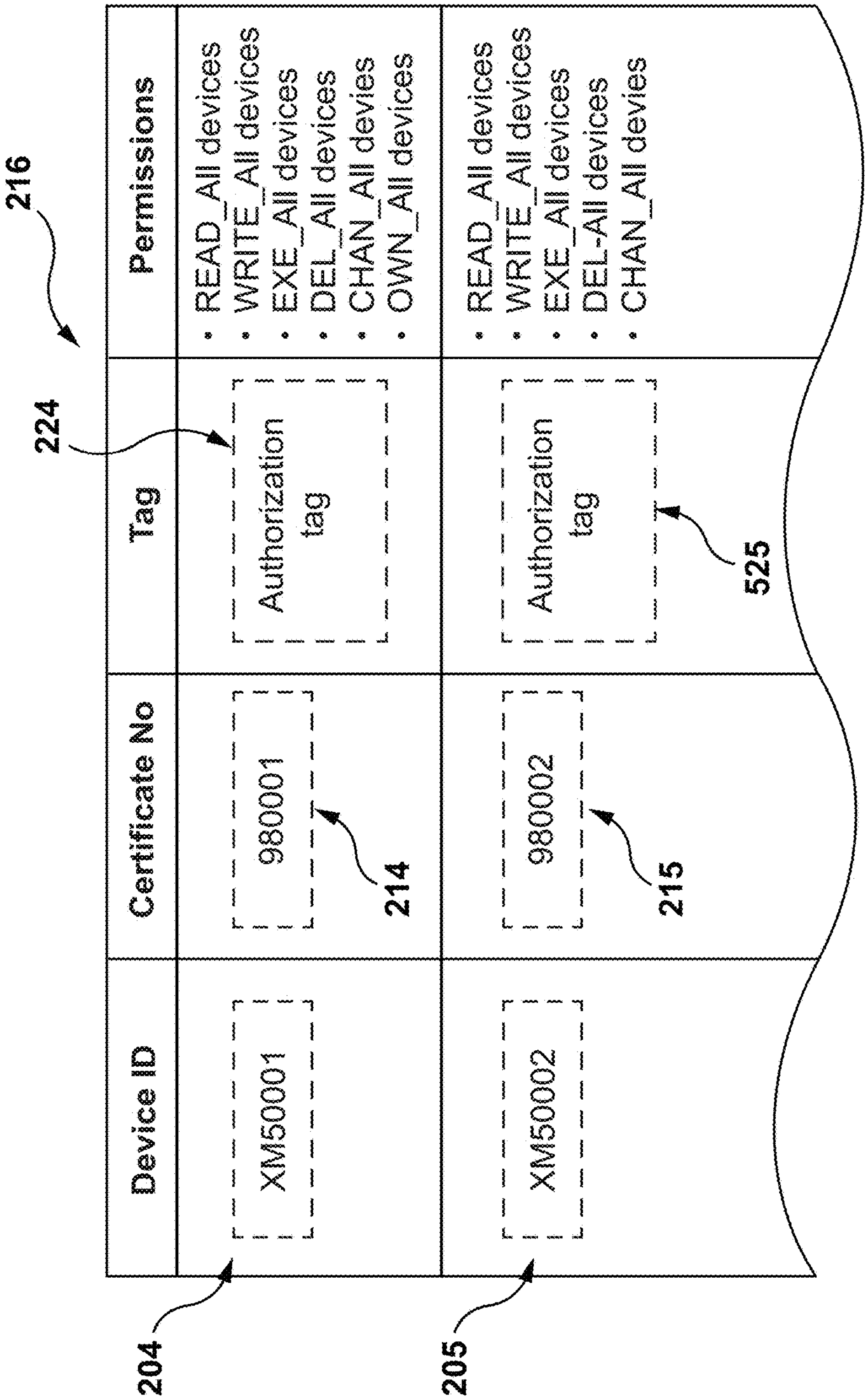
FIG. 5 depicts a schematic diagram of the certificate database of FIG. 3 where the safety tag has been replaced with an authorization tag in response to determining, by the server present in the networked computing environment of FIG. 2, that a breach event, associated with the given electronic device, has been resolved, in accordance with certain non-limiting embodiments of the present technology.

Further, in response to determining, for example, through monitoring the plurality of predetermined device parameters of each one of the first and second electronic devices 204, 205, that the occurrence of the breach event associated with the second electronic device 205 has been resolved, the NAC server 202 can be configured to: (i) remove, in the certificate database 216, the safety mode tag 225 from the second digital certificate 215; and (ii) assign thereto back the second authorization tag 525, as schematically depicted in FIG. 5, in accordance with certain non-limiting embodiments of the present technology. By doing so, the NAC server 202 can be configured to enable electronic devices having the second digital certificate 215, such as the second electronic device 205, to execute the initial scope of actions in LAN 208, authorized prior to the second electronic device 205 breaching the network security polices.

For example, if the NAC server 202 assigned the safety mode tag 225 to the second digital certificate 215 in response to determining that the antivirus application had been deactivated on the second electronic device 205, then in response to determining that the antivirus application has been activated on the second electronic device 205, the NAC server 202 can be configured to replace, in the certificate database 216, the safety mode tag 225 of the second digital certificate 215 back with the second authorization tag 525.

Further, after receiving the data of association between the second digital certificate 215 and the second authorization tag 525, the authentication server 212 can be configured to enable, based on the second digital certificate 215, the second electronic device 205 to (i) access the LAN 208; and (ii) execute the respective predetermined scope of actions on the predetermined list of electronic devices as specified in the second authorization tag 525.

Method

Figure 6:
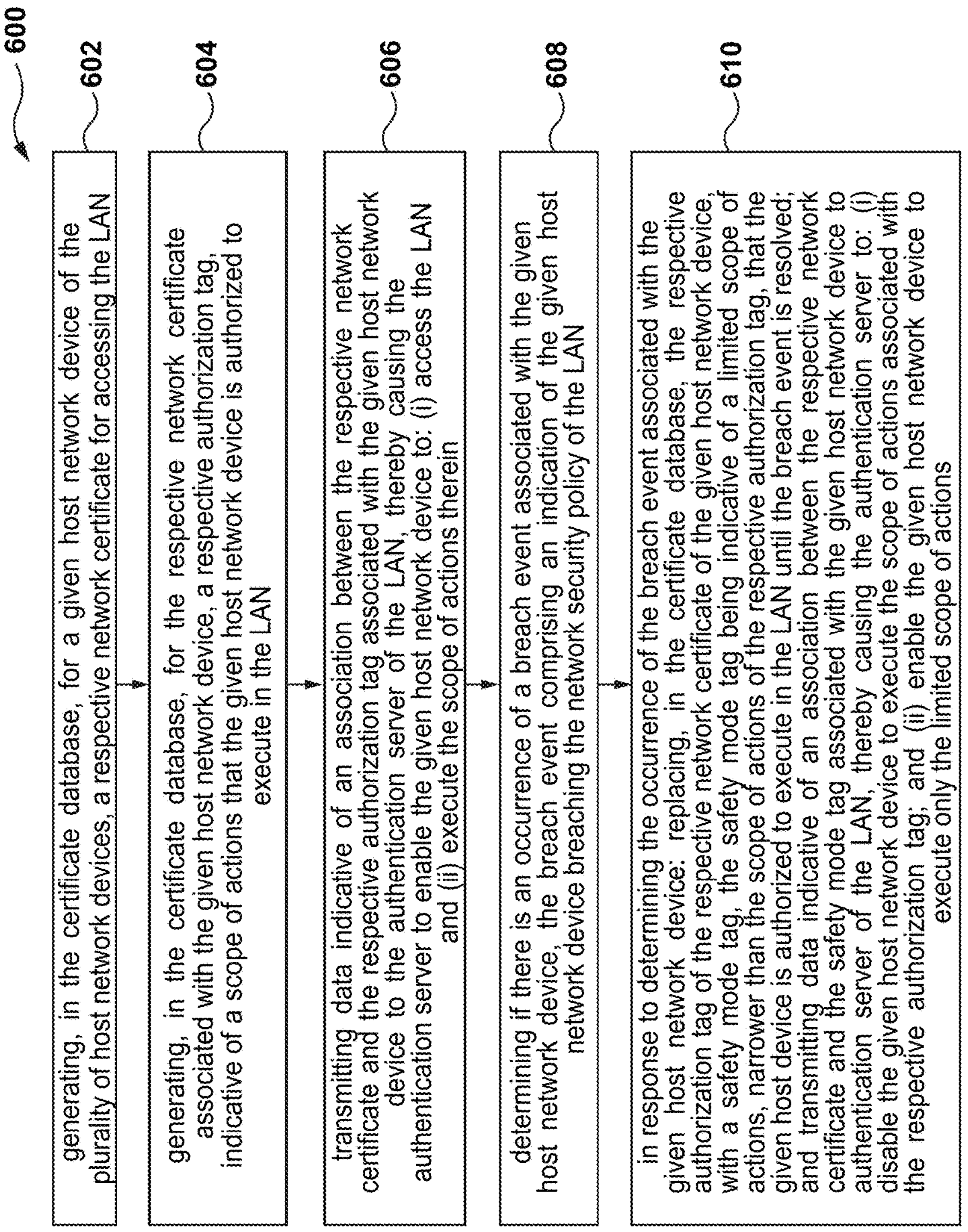
FIG. 6 depicts a flowchart diagram of a method for the port-based NAC of the plurality of electronic devices to the LAN, in accordance with certain non-limiting embodiments of the present technology.

Given the architecture and the examples provided hereinabove, it is possible to execute a method for port-based NAC of the plurality of electronic devices in a given LAN, such as the first and second electronic devices 204, 205 to the LAN 208. With reference to FIG. 6, there is depicted a flowchart of a method 600, according to the non-limiting embodiments of the present technology. The method 600 can be executed by the NAC server 202 including components of the computer system 100.

Step 602: Generating, in the Certificate Database, for a Given Host Network Device of the Plurality of Host Network Devices, a Respective Network Certificate for Accessing the LAN The method 600 commences at step 602 with the NAC server 202 being configured to issue, for each one of the first and second electronic devices 205, 205, the first and second digital certificate 214, 215, respectively, as described in detail above with reference to FIGS. 2 and 3. As mentioned above the NAC server 202 can be configured to store each one of the first and second digital certificates 214, 215 in the certificate database 216 in association with the respective ID numbers of the first and second electronic devices 204, 205.

According to certain non-limiting embodiments of the present technology, the given digital certificate, such as the first digital certificate 214 generated for the first electronic device 204, can enable the authentication server 212 to validate messages (such as requests for access to the LAN 208) transmitted thereto by the first electronic device 204, whereby the authentication server 212 can be configured to authorize access of the first electronic device 204 to the LAN 208.

As noted further above, in some non-limiting embodiments of the present technology, where the NAC server 202 can be configured to implement the NAC in accordance with the IEEE 802.1x standard, the given one of the first and second digital certificates 214, 215 can be of the X.509 format.

The method 600 thus advances to step 604.

Step 604: Generating, in the Certificate Database, for the Respective Network Certificate Associated with the Given Host Network Device, a Respective Authorization Tag, Indicative of a Scope of Actions that the Given Host Network Device is Authorized to Execute in the LAN At step 604, according to certain non-limiting embodiments of the present technology, the NAC server 202 can be configured to generate, in the certificate database 216, for each one of the first and second digital certificate 214, 215, a respective authorization tag, such as the first and second authorization tags 224, 525. As noted hereinabove with reference to FIG. 3, the given authorization tag, such as the first authorization tag 224 assigned to the first digital certificate 214 defines: (i) the respective predetermined scope of actions that the first electronic device 204 is authorized to execute in the LAN 208; and (ii) the respective list of electronic devices, on which the first electronic device 204 is authorized to execute the respective predetermined scope of actions.

The method 600 hence advances to step 606.

Step 606: Transmitting Data Indicative of an Association Between the Respective Network Certificate and the Respective Authorization Tag Associated with the Given Host Network Device to the Authentication Server of the LAN, Thereby Causing the Authentication Server to Enable the Given Host Network Device to: (I) Access the LAN and (II) Execute the Scope of Actions Therein At step 606, in some non-limiting embodiments of the present technology, the NAC server 202 can be configured to transmit information of the association between, for example, the first authorization tag 224 tag and the first digital certificate 214 to the authentication server 212, thereby causing the authentication server 212 to enable the first electronic device 204 to execute, in the LAN 208, the respective predetermined scope of actions on the respective list of electronic devices specified in the first authorization tag 224.

The method 600 thus proceeds to step 608.

Step 608: Determining if there is an Occurrence of a Breach Event Associated with the Given Host Network Device, the Breach Event Comprising an Indication of the Given Host Network Device Breaching the Network Security Policy of the LAN At step 608, according to certain non-limiting embodiments of the present technology, the NAC server 202 can be configured to determine if there is the occurrence of the breach event associated with any one of the first and second electronic devices 204, 205. In other words, at this step, the NAC server 202 can be configured to determine if at least one of the first and second electronic devices 204, 205 has breached at least one of the network security polices of the LAN 208.

To do so, in some non-limiting embodiments of the present technology, the NAC server 202 can be configured to determine if at least one of the current values of the plurality of predetermined devices parameters of the at least one of the first and second electronic devices 204, 205 deviates from the corresponding target values thereof specified by the network security polices, as described above with reference to FIG. 2. According to certain non-limiting embodiments of the present technology, the NAC server 202 can be configured to monitor the current values of the plurality of predetermined device parameters of each one of the first and second electronic devices 204, 205 via at least one of the internal and network device monitoring manager applications 206, 210 as mentioned above with reference to FIG. 2. In some non-limiting embodiments of the present technology, the NAC server 202 can be configured to determine the occurrence of the breach event in response to the at least one of the current values of the plurality of predetermined device parameters received from the internal device monitoring manager application 206 of the given electronic device being different from the corresponding values provided by the network device monitoring manager application 210.

In some non-limiting embodiments of the present technology, the NAC server 202 can be configured to determine the occurrence of the breach event in response to determining that there are at least two overlapping sessions of electronic devices in the LAN 208 that have accessed the LAN 208 with the same digital certificate. For example, the NAC server 202 can be configured to determine the network session overlap 406 between the first network session 402 of the second electronic device 205 and the second network session 402 of the third electronic device 405 that have accessed the LAN 208 both using the second digital certificate 215, as described above with reference to FIG. 4.

The method 600 hence advances to step 610.

Step 610: In Response to Determining the Occurrence of the Breach Event Associated with the Given Host Network Device: Replacing, in the Certificate E Database, the Respective Authorization Tag of the Respective Network Certificate of the Given Host Network Device, with a Safety Mode Tag At step 610, according to certain non-limiting embodiments of the present technology, in response to determining the occurrence of the breach event associated with the given electronic device, such as the second electronic device 205, the NAC server 202 can be configured to replace, in the certificate database 216, the second authorization tag 525, initially assigned to the second digital certificate 215, with the safety mode tag 225.

According to certain non-limiting embodiments of the present technology, the safety mode tag 225 can specify a limited scope of actions that is narrower than the respective predetermined scope of actions specified in the second authorization tag 525, such as only reading or executing executable files of the electronic devices connected to the LAN 208. In other non-limiting embodiments of the present technology, the safety mode tag 225 can specify a limited list of electronic devices, on which an electronic device having the second digital certificate 215 is authorized to execute the permitted actions. For example, electronic devices included in the limited list of electronic devices can be associated with lesser risk of compromising other electronic devices of the LAN 208. In yet other non-limiting embodiments of the present technology, the safety mode tag 225 can specify both, the limited scope of actions, which the electronic device having the second digital certificate 215 is authorized to execute, and the limited list of electronic devices, on which the electronic devices having the second digital certificate 215 is authorized to execute the limited scope of actions. In yet other non-limiting embodiments of the present technology, the safety mode tag 225 of the second digital certificate can include an indication to prohibit any access to the electronic device having the second digital certificate 215 to the LAN 208.

Further, once the NAC server 202 has replaced, in the certificate database 216, the second authorization tag 525 of the second digital certificate 215 with the safety mode tag 225, the NAC server 202 can be configured to transmit data indicative of the association between the second digital certificate 215 and the safety mode tag 225, which can comprise an update of the certificate database 216, to the authentication server 212. In turn, the authentication server 212, after receiving the data of the association between the second digital certificate 215 and the safety mode tag 225, in response to a request from the electronic device with the second digital certificate 215 (such as the second electronic device 205) for access to the LAN 208, can be configured to provide access to the second electronic device 205 in accordance with permissions specified in the safety mode tag 225, that is, at least one of (i) authorizing the second electronic device 205 to execute the limited scope of actions; and (ii) authorizing the second electronic device 205 to execute the permitted actions on the limited list of electronic devices of the LAN 208.

Further, in response to determining, for example, through monitoring the plurality of predetermined device parameters of each one of the first and second electronic devices 204, 205, that the occurrence of the breach event associated with the second electronic device 205 has been resolved, the NAC server 202 can be configured to: (i) remove, in the certificate database 216, the safety mode tag 225 from the second digital certificate 215; (ii) assign thereto back the second authorization tag 525; and (iii) transmit information of the association of between the second digital certificate 215 and the second authorization tag 525 to the authentication server 212, thereby causing the authentication server 212 to enable access of the second electronic device 205 to the LAN in accordance with the permission specified in the second authorization tag 525.

The method 600 hence terminates.

Thus, certain non-limiting embodiments of the method 600 may allow (i) identifying suspicious electronic devices in the LAN 208 more effectively; and (ii) preventing access thereto of such electronic devices in a more expeditious manner, which may help increase security of the LAN 208 and user experience of users thereof.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implementable method for port-based network access control of a plurality of host network devices in a local area network (LAN), the port-based network access control being implemented in accordance with an IEEE 802.1x standard, the LAN including (i) an authentication server configured to allow access of the plurality of host network devices to the LAN based on respective network certificates, and (ii) a server hosting a certificate database, the LAN being associated with a network security policy, the method comprising:

generating, in the certificate database, for a given host network device of the plurality of host network devices, a respective network certificate for accessing the LAN;

generating, in the certificate database, for the respective network certificate associated with the given host network device, a respective authorization tag, indicative of a scope of actions that the given host network device is authorized to execute in the LAN;

transmitting data indicative of an association between the respective network certificate and the respective authorization tag associated with the given host network device to the authentication server of the LAN, thereby causing the authentication server to enable the given host network device to: (i) access the LAN and (ii) execute the scope of actions therein;

determining if there is an occurrence of a breach event associated with the given host network device, the breach event comprising an indication of the given host network device breaching the network security policy of the LAN;

in response to determining the occurrence of the breach event associated with the given host network device:

replacing, in the certificate database, the respective authorization tag of the respective network certificate of the given host network device, with a safety mode tag, the safety mode tag being indicative of a limited scope of actions, narrower than the scope of actions of the respective authorization tag, that the given host device is authorized to execute in the LAN until the breach event is resolved; and transmitting data indicative of an association between the respective network certificate and the safety mode tag associated with the given host network device to authentication server of the LAN, thereby causing the authentication server to: (i) disable the given host network device to execute the scope of actions associated with the respective authorization tag; and (ii) enable the given host network device to execute only the limited scope of actions.

2. The method of claim 1, wherein:

the breach event comprises an indication of an other host network device of the plurality of host network devices using the respective network certificate associated with the given host network device for accessing the LAN; and the determining the occurrence of the breach event comprises:

monitoring, based on respective network certificates, sessions of each one of the plurality of host network devices in the LAN over a given period; and identifying an overlap of at least two sessions of using the respective network certificate associated with the given host device longer than a predetermined threshold period.

3. The method of claim 1, wherein:

the breach event comprises an indication of a deviation of a current value of at least one predetermined device parameter of a plurality of predetermined device parameters of the given host network device from a respective predetermined value thereof; and the determining the occurrence of the breach event comprises monitoring current values of the plurality of predetermined device parameters of the given host network device.

4. The method of claim 3, wherein the monitoring comprises causing the given host electronic device to: (i) collect, using an internal device monitoring manager, the current values of each one of the plurality of predetermined device parameters; and (ii) transmit the current values of each one of the plurality of predetermined device parameters to the server.

5. The method of claim 4, wherein the internal device monitoring manager is an Osquery internal device monitoring manager.

6. The method of claim 3, wherein the monitoring comprises the server executing a network device monitoring manager configured to query, over the LAN, at least a portion of the plurality of host network devices, including the given host network device, for the current values of each one of the plurality of predetermined device parameters thereof.

7. The method of claim 6, wherein the network device monitoring manager comprises at least one of an SCCM, Jamf, and Salt Manager network device monitoring managers.

8. The method of claim 3, wherein the monitoring comprises:

causing the given host electronic device to: (i) collect, using an internal device monitoring manager, the current values of each one of the plurality of predetermined device parameters; and (ii) transmit the current values of each one of the plurality of predetermined device parameters to the server; and the server executing a network device monitoring manager configured to query, over the LAN, at least a portion of the plurality of host network devices, including the given host network device, for the current values of each one of the plurality of predetermined device parameters thereof; and wherein the breach event comprises an indication of the deviation of the current value of the at least one predetermined device parameter of the given host network device from the respective predetermined value thereof determined by both the internal device monitoring manager and the system center configuration device manager.

9. The method of claim 1, wherein in response to determining that the breach event has been resolved, the method further comprises:

replacing, in the certificate database, the safety tag of the respective network certificate of the given host network device back with the respective authorization tag; and transmitting the data indicative of the association between the respective network certificate and the respective authorization tag associated with the given host network device to the authentication server of the LAN, thereby causing the authentication server to enable the given host network device to execute the scope of actions.

10. A server for port-based network access control of a plurality of host network devices in a local area network (LAN), the port-based network access control being implemented in accordance with an IEEE 802.1x standard, the LAN including an authentication server configured to allow access of the plurality of host network devices to the LAN based on respective network certificates, the LAN being associated with a network security policy, the server hosting a certificate database, the server comprising at least one processor and at least one non-transitory computer-readable medium comprising executable instructions, which, when executed by the at least one processor, cause the server to:

generate, in the certificate database, for a given host network device of the plurality of host network devices, a respective network certificate for accessing the LAN;

generate, in the certificate database, for the respective network certificate associated with the given host network device, a respective authorization tag, indicative of a scope of actions that the given host network device is authorized to execute in the LAN;

transmit data indicative of an association between the respective network certificate and the respective authorization tag associated with the given host network device to the authentication server of the LAN, thereby causing the authentication server to enable the given host network device to: (i) access the LAN and (ii) execute the scope of actions therein;

determine if there is an occurrence of a breach event associated with the given host network device, the breach event comprising an indication of the given host network device breaching the network security policy of the LAN;

in response to determining the occurrence of the breach event associated with the given host network device:

replace, in the certificate database, the respective authorization tag of the respective network certificate of the given host network device, with a safety mode tag, the safety mode tag being indicative of a limited scope of actions, narrower than the scope of actions of the respective authorization tag, that the given host device is authorized to execute in the LAN until the breach event is resolved; and transmit data indicative of an association between the respective network certificate and the safety mode tag associated with the given host network device to authentication server of the LAN, thereby causing the authentication server to: (i) disable the given host network device to execute the scope of actions associated with the respective authorization tag; and (ii) enable the given host network device to execute only the limited scope of actions.

11. The server of claim 10, wherein:

the breach event comprises an indication of an other host network device of the plurality of host network devices using the respective network certificate associated with the given host network device for accessing the LAN; and to determine the occurrence of the breach event, the at least one processor causes the server to:

monitor, based on respective network certificates, sessions of each one of the plurality of host network devices in the LAN over a given period; and identify an overlap of at least two sessions of using the respective network certificate associated with the given host device longer than a predetermined threshold period.

12. The server of claim 10, wherein:

the breach event comprises an indication of a deviation of a current value of at least one predetermined device parameter of a plurality of predetermined device parameters of the given host network device from a respective predetermined value thereof; and to determine the occurrence of the breach event, the at least one processor causes the server to monitor current values of the plurality of predetermined device parameters of the given host network device.

13. The server of claim 12, wherein to monitor the current values of the plurality of predetermined device parameters, the at least one processor causes the server to cause the given host electronic device to: (i) collect, using an internal device monitoring manager, the current values of each one of the plurality of predetermined device parameters; and (ii) transmit the current values of each one of the plurality of predetermined device parameters to the server.

14. The server of claim 13, wherein the internal device monitoring manager is an Osquery internal device monitoring manager.

15. The server of claim 12, wherein to monitor the current values of the plurality of predetermined device parameters, the at least one processor causes the server to execute a network device monitoring manager configured to query, over the LAN, at least a portion of the plurality of host network devices, including the given host network device, for the current values of each one of the plurality of predetermined device parameters thereof.

16. The server of claim 15, wherein the network device monitoring manager comprises at least one of an SCCM, Jamf, and Salt Manager network device monitoring managers.

17. The server of claim 12, wherein to monitor the current values of the plurality of predetermined device parameters, the at least one processor causes the server to:

cause the given host electronic device to: (i) collect, using an internal device monitoring manager, the current values of each one of the plurality of predetermined device parameters; and (ii) transmit the current values of each one of the plurality of predetermined device parameters to the server; and execute a network device monitoring manager configured to query, over the LAN, at least a portion of the plurality of host network devices, including the given host network device, for the current values of each one of the plurality of predetermined device parameters thereof; and wherein the breach event comprises an indication of the deviation of the current value of the at least one predetermined device parameter of the given host network device from the respective predetermined value thereof determined by both the internal device monitoring manager and the system center configuration device manager.

18. The server of claim 10, wherein in response to determining that the breach event has been resolved, the at least one processor further causes the server to:

replace, in the certificate database, the safety tag of the respective network certificate of the given host network device back with the respective authorization tag; and transmit the data indicative of the association between the respective network certificate and the respective authorization tag associated with the given host network device to the authentication server of the LAN, thereby causing the authentication server to enable the given host network device to execute the scope of actions.

* * * * *